(12) United States Patent
Ikematsu et al.

(10) Patent No.: US 8,444,230 B2
(45) Date of Patent: May 21, 2013

(54) VEHICLE MOTION CONTROL APPARATUS

(75) Inventors: Atsushi Ikematsu, Kariya (JP); Toshihisa Kato, Handa (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 1287 days.

(21) Appl. No.: 12/068,336

(22) Filed: Feb. 5, 2008

(65) Prior Publication Data
US 2008/0207391 A1    Aug. 28, 2008

(30) Foreign Application Priority Data
Feb. 9, 2007    (JP) .................................. 2007-030688

(51) Int. Cl.
*B60T 8/66*    (2006.01)

(52) U.S. Cl.
USPC .............. 303/156; 303/150; 303/11; 303/140

(58) Field of Classification Search
USPC ............. 303/10, 11, 139, 140, 146, 148, 149, 303/150, 155, 156
See application file for complete search history.

(56) References Cited

U.S. PATENT DOCUMENTS

| | | | |
|---|---|---|---|
| 4,912,641 A * | 3/1990 | Kuwana et al. .................. 701/79 |
| 4,969,696 A * | 11/1990 | Yogo et al. ..................... 303/156 |
| 5,257,192 A * | 10/1993 | Masaki ............................ 701/79 |
| 5,558,414 A * | 9/1996 | Kubota .................... 303/122.08 |
| 5,711,582 A | 1/1998 | Koike | |
| 5,788,342 A * | 8/1998 | Noguchi .................... 303/116.2 |
| 6,003,957 A | 12/1999 | Toda et al. | |
| 6,095,620 A * | 8/2000 | Dillard et al. ................... 303/11 |
| 6,174,033 B1 | 1/2001 | Busch et al. | |
| 6,185,497 B1 * | 2/2001 | Taniguchi et al. .............. 701/70 |
| 6,188,947 B1 * | 2/2001 | Zhan .............................. 701/71 |
| 6,234,588 B1 * | 5/2001 | Sawada ..................... 303/119.1 |

(Continued)

FOREIGN PATENT DOCUMENTS

| | | |
|---|---|---|
| DE | 198 20 884 A1 | 11/1999 |
| DE | 10 2004 040 054 A1 | 3/2005 |

(Continued)

OTHER PUBLICATIONS

Official Action issued Jul. 7, 2011 by the German Patent Office in corresponding German Patent Application No. 10 2008 000 228.3, and English language translation of the Official Action.

(Continued)

*Primary Examiner* — Bradley T King
*Assistant Examiner* — Thomas Irvin
(74) *Attorney, Agent, or Firm* — Buchanan Ingersoll & Rooney PC

(57) ABSTRACT

A vehicle motion control apparatus includes hydraulic pressure applying means for applying hydraulic pressure to a wheel cylinder side of any of plural solenoid valves, respectively arranged between a master cylinder and plural wheel cylinders, for the corresponding wheel cylinders even when an operator of the vehicle does not operate a brake operation member, motor controlling means for controlling an output of the electric motor to be reduced in accordance with a condition of a road surface when the hydraulic pressure is applied to the wheel cylinder, and valve controlling means for controlling the operation of the solenoid valve to increase an amount of the brake fluid flown by the operation of the solenoid valve before the output of the electric motor is reduced when the output of the electric motor is controlled to be reduced.

14 Claims, 8 Drawing Sheets

U.S. PATENT DOCUMENTS

| | | | |
|---|---|---|---|
| 6,238,019 B1 * | 5/2001 | Okazaki et al. | 303/146 |
| 6,345,869 B1 * | 2/2002 | Matsuo et al. | 303/116.1 |
| 6,377,885 B2 * | 4/2002 | Yasui et al. | 701/80 |
| 6,582,034 B2 | 6/2003 | Hara et al. | |
| 6,612,662 B2 * | 9/2003 | Ohtsu | 303/156 |
| 6,945,610 B1 * | 9/2005 | Mizutani et al. | 303/114.1 |
| 7,165,818 B2 | 1/2007 | Iwasaki et al. | |
| 7,290,841 B2 * | 11/2007 | Isono | 303/114.1 |
| 7,448,700 B2 * | 11/2008 | Terasaka | 303/164 |
| 7,568,773 B2 * | 8/2009 | Nomura et al. | 303/115.5 |
| 2002/0135229 A1 * | 9/2002 | Ohtsu | 303/156 |
| 2004/0239174 A1 * | 12/2004 | Kokubo | 303/10 |
| 2005/0236891 A1 * | 10/2005 | Terasaka | 303/115.1 |
| 2007/0205658 A1 * | 9/2007 | Sato et al. | 303/10 |

FOREIGN PATENT DOCUMENTS

| | | |
|---|---|---|
| DE | 10 2006 033 249 A1 | 2/2007 |
| JP | 07-117653 A * | 5/1995 |
| JP | 8-310371 A | 11/1996 |
| JP | 10-67311 A | 3/1998 |
| JP | 2000-203401 A | 7/2000 |
| JP | 2002-46588 A | 2/2002 |
| JP | 2007-022391 A | 2/2007 |

OTHER PUBLICATIONS

Japanese Office Action dated May 8, 2012 issued in the corresponding Japanese Patent Application No. 2007-030688 and English-language translation.

* cited by examiner

VEHICLE MOTION CONTROL APPARATUS

CROSS REFERENCE TO RELATED APPLICATIONS

This application is based on and claims priority under 35 U.S.C. §119 to Japanese Patent Application 2007-030688, filed on Feb. 9, 2007, the entire content of which is incorporated herein by reference.

FIELD OF THE INVENTION

This invention generally relates to a vehicle motion control apparatus.

BACKGROUND

A known vehicle motion control apparatus is disclosed in Japanese Patent Application No. 2000-203401A (hereinafter, referred to as reference 1). According to the motion control apparatus disclosed in reference 1, shutoff valves are arranged to be in a closed position and intake valves are arranged to be in an opened position. Further, hydraulic pressure pumps are operated and output brake hydraulic pressure of the hydraulic pressure pumps are supplied to a wheel cylinder, and so on, thus performing an automatic pressurization. Then, the smaller a frictional coefficient of a road surface is, the rotational speed of a motor lowers. In the mean time, the rotational speed of the motor lowers in accordance with an actual control amount approaching a target control amount. Consequently, an operational amount of each of the hydraulic pressure pumps is reduced and an operational noise is reduced.

According to the motion control apparatus disclosed in the reference 1, the smaller the frictional coefficient of the road surface is, the lower the rotational speed of the motor is arranged, thus leading to reduce the operational noise of the motor. However, when the rotational speed of the pump is reduced, a discharging amount of each pump is reduced. Accordingly, a pressure increasing rate relative to the wheel cylinder lowers under a target pressure increasing rate, which corresponds to a pressure increasing rate required for controlling a vehicle behavior. Therefore, there is a possibility that a pressure-increasing responsiveness may not be obtained properly.

A need thus exists for a vehicle motion control apparatus which is not susceptible to the drawback mentioned above.

SUMMARY OF THE INVENTION

According to an aspect of the present invention, a vehicle motion control apparatus, which is provided at a brake system including a master cylinder, wheel cylinders respectively provided at plural wheels of a vehicle, solenoid valves respectively provided between the master cylinder and the corresponding wheel cylinders and an electric motor operating a pump for controlling a supply of brake fluid to the wheel cylinder, includes hydraulic pressure applying means, motor controlling means, valve controlling means. The hydraulic pressure applying means is for applying hydraulic pressure to any one of the wheel cylinders by operating the pump with the electric motor to supply the brake fluid to a master cylinder side of the solenoid valve for the corresponding wheel cylinder and by controlling an operation of the solenoid valve to allow the brake fluid to flow to a wheel cylinder side of the solenoid valve even when an operator of the vehicle does not operate a brake operation member. The motor controlling means is for controlling an output of the electric motor to be reduced in accordance with a condition of a road surface, on which the vehicle drives, when the hydraulic pressure applying means applies the hydraulic pressure to the wheel cylinder. The valve controlling means is for controlling the operation of the solenoid valve to increase an amount of the brake fluid flown by the operation of the solenoid valve before the output of the electric motor is reduced when the motor controlling means controls the output of the electric motor to be reduced.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
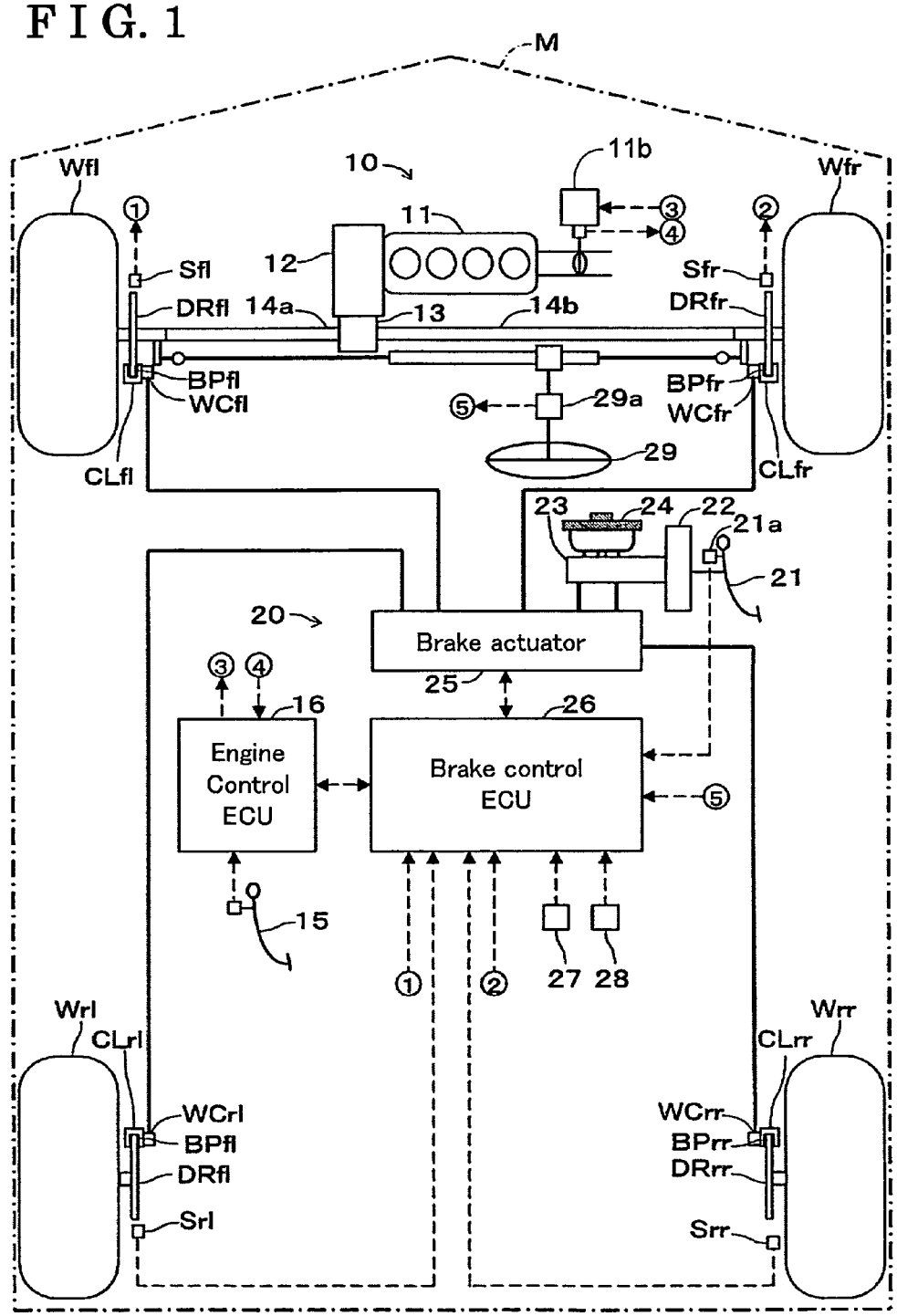
FIG. 1 is a schematic view illustrating a vehicle applied with a vehicle motion control apparatus according to an embodiment of the present invention.

An embodiment of a vehicle applied with a vehicle motion control apparatus according to the present invention will be described hereinafter with reference to attached drawings. FIG. 1 is a schematic view illustrating a structure of the vehicle, generally indicated at M, according to the embodiment. The vehicle M is a front wheel driving type vehicle. Driving force of an engine 11, which is mounted at a front portion of the vehicle M and serves as a driving source, is transmitted to front wheels. However, the vehicle M is not limited to be the front wheel driving type vehicle. Alternatively, the vehicle M may be other driving type vehicle, such as a rear wheel driving type vehicle, a four wheel driving type vehicle, or a vehicle including an electric motor serving as a driving source, for example.

The vehicle M includes a driving system 10 for driving the vehicle M and a brake system 20 for braking the vehicle M. The driving system 10 includes the engine 11, a transmission 12, a differential 13, a left drive shaft 14a, a right drive shaft 14b, an accelerator pedal 15 and an engine control ECU 16, operations of all which will not be described in detail herein.

The vehicle M is provided with plural wheels, which is a front-left wheel Wfl, a front-right wheel Wfr, a rear-left wheel Wrl and a rear-right wheel Wrr. The brake system 20 is structured with a hydraulic brake apparatus for braking the vehicle M, i.e., for slowing down and/or stopping the vehicle M, by applying hydraulic braking force to the wheels Wfl, Wfr, Wrl and Wrr. The hydraulic brake apparatus 20 (brake system 20) includes a vacuum booster 22, a master cylinder 23, a reservoir tank 24, a brake actuator 25 and a brake control ECU 26. The vacuum booster 22 serves as a servo brake system. The master cylinder 23 generates brake fluid (oil) with fluid pressure (oil pressure) corresponding to a base hydraulic pressure generated in accordance with brake operation force (i.e., an operational condition of a brake pedal 21) boosted by the vacuum booster 22. Further, the master cylinder 23 supplies the brake fluid (oil) described above to wheel cylinders WCfl, WCfr, WCrl and WCrr. The reservoir tank 24 accumulates the brake fluid and supplies the same to the master cylinder 23. The brake actuator 25 is provided between the master cylinder and each of the wheel cylinders WCfl, WCfr, WCrl and WCrr. The brake actuator 25 generates controlling hydraulic pressure regardless of a pressing condition of the brake pedal 21 (i.e., even when an operator of the vehicle M does not operate the brake pedal 21) and is allowed to apply the controlling hydraulic pressure to the wheel(s) to be controlled. The brake control ECU 26 controls the brake actuator 25 and serves as a vehicle motion control apparatus for the vehicle M. The brake pedal 21 serves as a brake operation member. Additionally, the brake control ECU 26 is connected to the engine control ECU 16 so as to communicate with one another.

When each of the wheel cylinders WCfl, WCfr, WCrl, WCrr is supplied with the base hydraulic pressure or the controlling hydraulic pressure, pairs of brake pads BPfl, BPfr, BPrl, BPrr, all which serve as frictional members, are respectively pushed by pistons and press disc rotors DRfl, DRfr, DRrl and DRrr from both sides, respectively. The disc rotors DRfl, DRfr, DRrl and DRrr are rotational members which integrally rotate with the wheels Wfl, Wfr, Wrl and Wrr, respectively. Rotation of the wheels Wfl, Wfr, Wrl and Wrr are hence restrained. Additionally, according to the embodiment of the present invention, a disk type brake is employed. Alternatively, a drum type brake may be employed.

Figure 2:
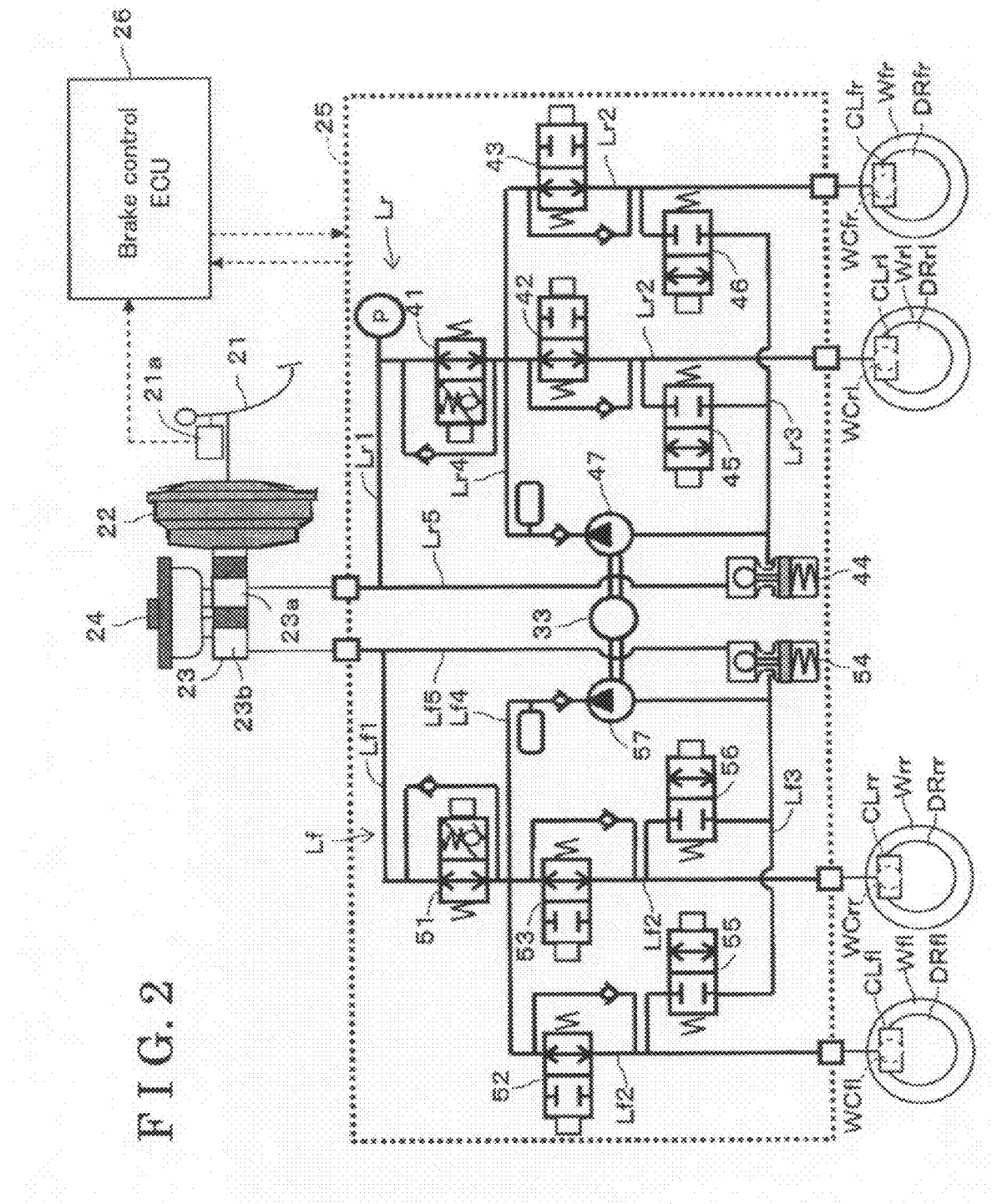
FIG. 2 is a block diagram schematically illustrating oil passages including a brake actuator illustrated in FIG. 1.

Next, with reference to FIG. 2, a structure of the brake actuator 25 will be described hereinafter. According to the embodiment, a generally-known brake actuator is employed as the brake actuator 25. The brake actuator 25 is structured with hydraulic pressure control valves 41 and 51, pressure increasing control valves 42, 43, 52 and 53, pressure reducing control valves 45, 46, 55 and 56, pressure regulation reservoirs 44 and 54, pumps 47 and 57, a motor (electric motor) 33, and so on. Each of the pressure increasing control valves 42, 43, 52 and 53 serves as a solenoid valve respectively provided between the master cylinder 23 and the corresponding wheel cylinder WC. Operations of the pressure increasing control valves 42, 43, 52 and 53 are controlled and hence allowing a predetermined amount of the brake fluid to flow towards the wheel cylinders WCfl, WCfr, WCrl and WCrr. Hereinafter, amount of the brake fluid corresponds to moving amount of fluid volume, or of fluid mass, of the brake fluid per unit of time. Additionally, the wheel cylinders WC, the valves (solenoid valves) 42, 43, 52 and 53, and the electric motor 33 operating the pumps 47, 57 for controlling a supply of the brake fluid to the wheel cylinders WC**, are included in the brake system (hydraulic brake apparatus) 20 as well as the brake control ECU 25 and the master cylinder 23.

According to the embodiment, a brake conduit system of the hydraulic brake apparatus 20 is structured as a diagonal conduit type (X conduit type). As illustrated in FIG. 2, the brake actuator 25 includes a first oil passage Lr (Lr1, L2, Lr3, Lr4 and Lr5) connected to a first hydraulic pressure chamber 23a of the master cylinder 23 and a second oil passage Lf (Lf1, Lf2, Lf3, Lf4 and Lf5) connected to a second hydraulic pressure chamber 23b of the master cylinder 23. The first oil passage Lr allows the first hydraulic pressure chamber 23a and each of the wheel cylinders WCrl and WCfr, which is provided at the corresponding wheel Wrl and Wfr, to communicate with one another. The second lubrication passage Lf allows the second hydraulic pressure chamber 23b and each of the wheel cylinders WCfl and WCrr, which is provided at the corresponding wheel Wfl and Wrr, to communicate with one another.

The first oil passage Lr of the brake actuator 25 is provided with the hydraulic pressure control valve 41 configured by a pressure difference control valve. The hydraulic pressure control valve 41 is controlled to be in a fluid communicating state, a pressure-difference generating state, and in a fluid-communication interrupting state by the brake control ECU 26. More specifically, the hydraulic pressure control valve 41 is a normally opened linear solenoid valve, which is energized by command current of which a relationship with a desired command pressure difference is predetermined. When the command pressure difference is greater than an actual pressure difference generated between the master cylinder 23 and any of the wheel cylinders WCrl and WCfr, the hydraulic pressure control valve 41 is moved to a close direction by a distance corresponding to the command current, and the actual pressure difference generated between the master cylinder 23 and any of the wheel cylinders WCrl and WCfr is increased so as to approach the command pressure difference. Further, when the command pressure difference is smaller than the actual pressure difference, the hydraulic pressure control valve 41 is moved to an open direction by a distance corresponding to the command current, and the actual pressure generated between the master cylinder 23 and any of the wheel cylinders WCrl and WCfr is reduced so as to approach the command pressure difference. When the hydraulic pressure control valve 41 is in the fluid communicating state, flow of the brake fluid in the first oil passages Lr1 and Lr2 is established, or a fluid communication between the master cylinder 23 and any of the wheel cylinders WCrl and WCfr is established. When the hydraulic pressure control valve 41 is in the pressure-difference generating state, pressure difference between the master cylinder pressure and wheel cylinder pressure of the corresponding wheel cylinder WCrl and WCfr is generated. When the hydraulic pressure control valve 41 is in the fluid-communication interrupting state, the flow of the brake fluid in the first oil passages Lr1 and Lr2 is interrupted by the hydraulic pressure control valve 41, or the fluid communication between the master cylinder 23 and the wheel cylinders WCrl and WCfr is interrupted by hydraulic pressure control valve 41. The hydraulic pressure control valve 41 is normally not electrically energized and is established in the fluid communicating state. However, when the hydraulic pressure control valve 41 is electrically energized and is switched to the pressure-difference generating state (i.e., to the close direction), a hydraulic pressure in the oil passage Lr2, which is arranged at a wheel cylinder side (side of the wheel cylinders WCrl and WCfr), is maintained to be higher by a predetermined control differential pressure than a hydraulic pressure in the oil passage Lr1 at a master cylinder side. The control differential pressure is controlled or regulated by the brake control ECU 26 in response to control electric current supplied to the hydraulic pressure control valve 41.

The first oil passage Lr2 is branched to two passages. One passage of the first oil passage Lr2 is provided with the pressure increasing control valve 42 for controlling an increase of a brake fluid pressure applied to the wheel cylinder WCrl when an operation mode of an ABS control is in a pressure applying mode. The other passage of the first oil passage Lr2 is provided with the pressure increasing control valve 43 for controlling an increase of a brake fluid pressure applied to the wheel cylinder WCfr when the operation mode of the ABS control is in the pressure applying mode. Each of the pressure increasing control valves 42 and 43 is configured as a two-position valve that can be controlled to be in a fluid communicating (opened) state and a fluid-communication interrupting (closed) state by means of the brake control ECU 26. When the pressure increasing control valve 42 is in the fluid communicating state, flow of the brake fluid in the first oil passage Lr2, or a fluid communication between the hydraulic pressure controlling valve 41 and the wheel cylinder WCrl, is established. When the pressure increasing control valve 42 is in the fluid-communication interrupting state, the flow of the brake fluid in the first oil passage Lr2, or the fluid communication between the hydraulic pressure controlling valve 41 and the wheel cylinder WCrl, is interrupted. Since the operation of the pressure increasing control valve 43 is the same as the above-described operation of the pressure increasing control valve 42, a description of the operation of the valve 43 will be omitted herein for simplifying the description. Each of the pressure increasing control valves 42, 43 is a normally opened on-off solenoid valve which is in the fluid communicating state when not being energized and which is in the fluid-communication interrupting state when being energized. When each of the pressure increasing control valves 42, 43 is controlled to be in the fluid communicating state, the base hydraulic pressure of the master cylinder and/or the controlling hydraulic pressure, which is generated by operating the pump 47 and by controlling the hydraulic control valve 41, can be applied to the corresponding wheel cylinders WCrl and WCfr. Further, the pressure increasing control valves 42 and 43 can perform the ABS control with the pressure reducing control valves 45, 46 and the pump 47. In addition, when a normal brake operation is performed without executing the ABS control, i.e., the ABS is in a non-operation mode, the pressure increasing control valves 42, 43 are normally controlled to be in the fluid communicating state (i.e., in the opened state).

Further, the oil passage Lr2 which is arranged between the pressure increasing control valve 42 and the wheel cylinder WCrl, and the other oil passage Lr2 which is arranged between the pressure increasing control valve 43 and the wheel cylinder WCfr, are connected to the pressure regulation reservoir 44 via the oil passage Lr3, respectively. The oil passage Lr3 is provided with pressure reducing control valves 45 and 46 which can be controlled to be in a fluid communicating (opened) state and a fluid-communication interrupting (closed) state by means of the brake control ECU 26. When the pressure reducing control valve 45 is in the fluid communicating state, flow of the brake fluid in the first oil passage Lr3, or a fluid communication between the wheel cylinder WCrl and the pressure regulation reservoir 44, is established. On the other hand, when the pressure reducing control valve 45 is in the fluid-communication interrupting state, the flow of the brake fluid in the first oil passage Lr3, or a fluid communication between the wheel cylinder WCrl and the pressure regulation reservoir 44, is interrupted. Since the operation of the pressure reducing control valve 46 is the same as the above-described operation of the pressure reducing control valve 45, a description of the operation of the pressure reducing control valve 46 will be omitted herein for simplifying the description. Each of the pressure reducing control valves 45 and 46 is a normally closed on-off solenoid valve which is in the fluid-communication interrupting state when not being energized and which is in the fluid communicating state when being energized. The pressure reducing control valves 45, 46 are normally in the fluid-communication interrupting state (i.e., in the closed state) when the normal brake operation is performed. In addition, the pressure reducing control valves 45 and 46 are properly switched to the fluid communicating state so that the brake fluid flows to the pressure regulation reservoir 44 via the oil passage Lf3. Thereby, the brake fluid pressure applied to the wheel cylinders WCrl, WCfr is controlled to prevent the corresponding wheels Wrl and Wfr from being locked.

The pump 47 is operated by the electric motor 33 in response to a command of the brake control ECU 26. Further, the pump 47 controls a supply of the brake fluid (discharges and sucks the brake fluid) to the master cylinder side of the pressure increasing control valves 42 and 43, which are respectively arranged between the master cylinder 23 and the wheel cylinders WCrl and WCfr.

When being in a pressure reducing mode of the ABS control, the pump 47 sucks the brake fluid, which is accumulated in the wheel cylinders WCrl and WCfr and/or in the pressure regulation reservoir 44, and returns the brake fluid to the master cylinder 23 via the hydraulic pressure control valve 41 being in the fluid communicating state.

Further, when a control, such as an electronic stability control, a traction control, and a brake assist, for automatically applying the fluid pressure to one of the wheel cylinders WCfl, WCfr, WCrl and WCrr, is performed, the pump 47 sucks the brake fluid accumulated in the master cylinder 23 via the oil passage Lr1, Lr5 and the pressure regulation reservoir 44 and supplies the controlling hydraulic pressure to each of the wheel cylinders WCrl and WCfr by discharging the brake fluid via the oil passages Lr4, Lr2 and the pressure increasing control valves 42, 43 being in the fluid communicating state so as to generate the control differential pressure to the hydraulic pressure control valve 41 shifted to the pressure-difference generating state.

Still further, the oil passage Lr1 is provided with a pressure sensor P for detecting the master cylinder pressure corresponding to a brake fluid pressure in the master cylinder 23. A detecting signal from the pressure sensor P is sent to the brake control ECU 26. Alternatively, the pressure sensor P may be provided at the oil passage Lf1. In addition, the second oil passage Lf of the brake actuator 25 is structured with oil passages Lf1, Lf2, Lf3, Lf4 and Lf5, in the same manner as the first oil passage Lr. Since structures and operations of other components in the second oil passage Lf, such as the valves 51 to 56, are the same as those in the first oil passage Lr, a detailed description will be omitted herein for simplifying the description.

As described above, the brake actuator 25 applies the hydraulic pressure, which corresponds to an operation state (pressing state) of the brake pedal 21 of the operator of the vehicle M, to the wheel cylinders WCfl, WCfr, WCrl and WCrr. Further, the brake actuator 25 is allowed to control the hydraulic pressure applied to the wheel cylinders WCfl, WCfr, WCrl and WCrr regardless of the operation state (pressing state) of the brake pedal 21.

Still further, as illustrated in FIG. 1, the brake control ECU 26 is connected to wheel speed sensors Sfl, Sfr, Srl and Srr, a yaw rate sensor 27, an acceleration sensor 28 and to a steering sensor 29a.

The wheel speed sensors Sfl, Sfr, Srl and Srr are respectively provided at the vicinity of the wheels Wfl, Wfr, Wrl and Wrr. The wheel speed sensor Sfl outputs a pulse signal with a frequency corresponding to rotational speed (wheel speed) of the wheel Wfl to the brake control ECU 26 (indicated by reference numeral ①), and the wheel speed sensor Sfr outputs a pulse signal with a frequency corresponding to rotational speed (wheel speed) of the wheel Wfr to the brake control ECU 26 (indicated by reference numeral ②). In the same manner, the wheel speed sensor Srl outputs a pulse signal with a frequency corresponding to rotational speed (wheel speed) of the wheel Wrl to the brake control ECU 26 and the wheel speed sensor Srr outputs a pulse signal with a frequency corresponding to rotational speed (wheel speed) of the wheel Wrr to the brake control ECU 26. The yaw rate sensor 27 detects yaw rate of the vehicle M and outputs a detection signal to the brake control ECU 26. The acceleration sensor 28 detects an acceleration of the vehicle M in a front-rear direction of the vehicle M and in a right-left direction thereof, for example, and outputs a detection signal to the brake control ECU 26. The steering sensor 29a detects a rotational angle of the steering wheel 29 rotated from a neutral position, and outputs a signal indicating an actual steering angle θ (a value corresponding to an actual steering angle) to the brake control ECU 26 (indicated by reference numeral ⑤).

In addition, as best shown in FIG. 1, the brake control ECU 26 is connected to a stop switch 21a which detects an ON/OFF state of the brake pedal 21.

The brake control ECU 26 includes a microcomputer which is not illustrated in the drawings. The microcomputer includes an input-output interface, a CPU, a RAM and a ROM, all which are connected to the microcomputer via buses and are not illustrated in the drawings. The CPU executes a program corresponding to flowcharts illustrated in FIGS. 3 to 5 and performs a stabilization control for the vehicle, such as the electronic stability control, for example.

Figure 3:
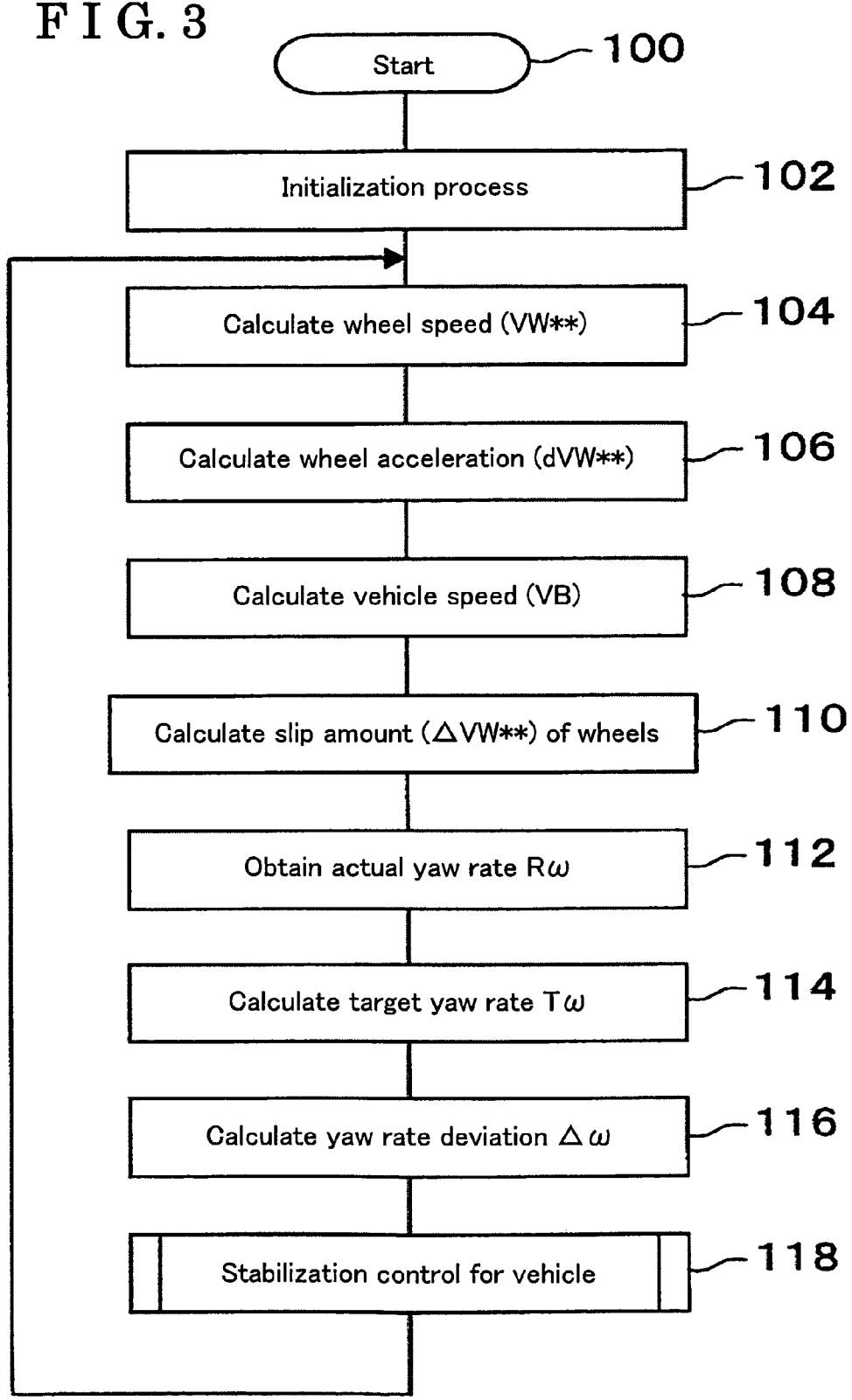
FIG. 3 is a flowchart schematically illustrating a control program performed by a brake control ECU illustrated in FIG. 1.

Next, from among controls performed by the vehicle motion control apparatus configured as described above, the electronic stability control will be described hereinafter with reference to the flowcharts illustrated in FIGS. 3 to 5. Firstly, when an ignition switch (not illustrated) of the vehicle M is switched to an ON state, the brake control ECU 26 executes a program corresponding to the flowchart illustrated in FIG. 3 (Step 100). When the brake control ECU 26 is operated, the brake control ECU 26 executes an initialization process (Step 102), such as clearing a memory and resetting a flag, and repeats subsequent processes (from Step 104 to Step 118) by every predetermined time T0 (5 milliseconds, for example).

Then, the brake control ECU 26 calculates wheel speed VW of each of the wheels Wfl, Wfr, Wlr and Wrr on the basis of the detection signals of the wheel speed respectively outputted from the wheel speed sensors Sfl, Sfr, Slr and Srr (Step 104). Then, the brake control ECU 26 calculates a wheel acceleration dVW of each of the wheels Wfl, Wfr, Wrl and Wrr, the wheel acceleration corresponding to a derivative of the wheel speed of each wheel Wfl, Wfr, Wrl and Wrr (Step 106). Subscripts  herein are applied with any of reference codes fl, fr, rl and rr, which respectively correspond to the front-left wheel, the front-right wheel, the rear-left wheel and the rear-right wheel, of the vehicle M. The subscripts  are used in the same manner in the description and in the drawings.

The brake control ECU 26 calculates vehicle speed VB on the basis of the wheel speeds VW, of the wheels Wfl, Wfr, Wrl and Wrr, obtained in Step 104 and more specifically on the basis of a maximum speed VWmax out of the vehicle speeds VW obtained in Step 104, for example (Step 108). Alternatively, the brake control ECU 26 may calculate an average value of the wheel speeds of the front-left wheel Wfl and the front-right wheel Wfr, or an average value of the wheel speeds of the rear-left wheel Wrl and the rear-right wheel Wrr, as the vehicle speed VB. Then, the brake control ECU 26 calculates a slip amount AVW of each of the wheels Wfl, Wfr, Wrl and Wrr on the basis of the vehicle speed VB calculated in Step 108 and the wheel speed VWfl, VWfr, VWrl and VWrr of each wheel Wfl, Wfr, Wrl and Wrr (Step 110**).

Then, in Step 112, the brake control ECU 26 obtains a signal indicating a direction and a largeness of the yaw rate outputted from the yaw rate sensor 27 as an actual yaw rate Rω which is generated at the vehicle M. Additionally, the brake control ECU 26 may calculate the actual yaw rate Rω on the basis of the wheel speeds VWfl, VWfr of the front-left wheel Wfl and the front-right wheel Wfr (or on the basis of the wheel speeds VWrl and VWrr of the rear-left wheel Wrl and the rear-right wheel Wrr).

Then, in Step 114, the brake control ECU 26 calculates a target yaw rate Tω. More specifically, the brake control ECU 26 firstly calculates the steering angle θ of the vehicle M from the signal indicating the actual steering angle θ inputted from the steering sensor 29a. Then, the brake control ECU 26 derives a cutting angle ξ of the steering wheel (steering angle of the vehicle M) from the calculated steering angle θ in accordance with an equation (1) described herein.

$$\text{Cutting angle } \xi \text{ of the steering wheel} = C \times \text{steering angle } \theta \tag{1}$$

In addition, the brake control ECU 26 calculates a target yaw rate Tω in accordance with an equation (2) described herein on the basis of the vehicle speed VB, the steering angle ξ of the vehicle M and a stability factor A.

$$T\omega = \frac{VB \times \xi}{L \times (A \times VB^2 + 1)} \tag{2}$$

Additionally, a reference code C is a proportionality constant (for example a steering gear ratio) of the cutting angle ξ of the steering wheel relative to the steering angle θ. In addition, the cutting angle ξ of the steering wheel corresponds to an angle in a steering direction where the steering wheel is steered, relative to a direction where the vehicle M is driven in a straight manner. Further, a reference code L is a wheelbase of the vehicle M.

Then, in Step 116, the brake control ECU 26 calculates a yaw rate deviation Δω by subtracting the actual yaw rate Rω obtained in Step 112 from the target yaw rate Tω calculated in Step 114 (Δω=Tω−Rω).

Then, in Step 118 (Step 200), the brake control ECU 26 compares threshold values Tus and Tos, which are set in advance, with the yaw rate deviation Δω calculated in Step 116. Then, the brake control ECU 26 performs the stabilization control for the vehicle M as required on the basis of a result of the comparison of the threshold values Tus and Tos with the yaw rate deviation Δω.

Figure 4:
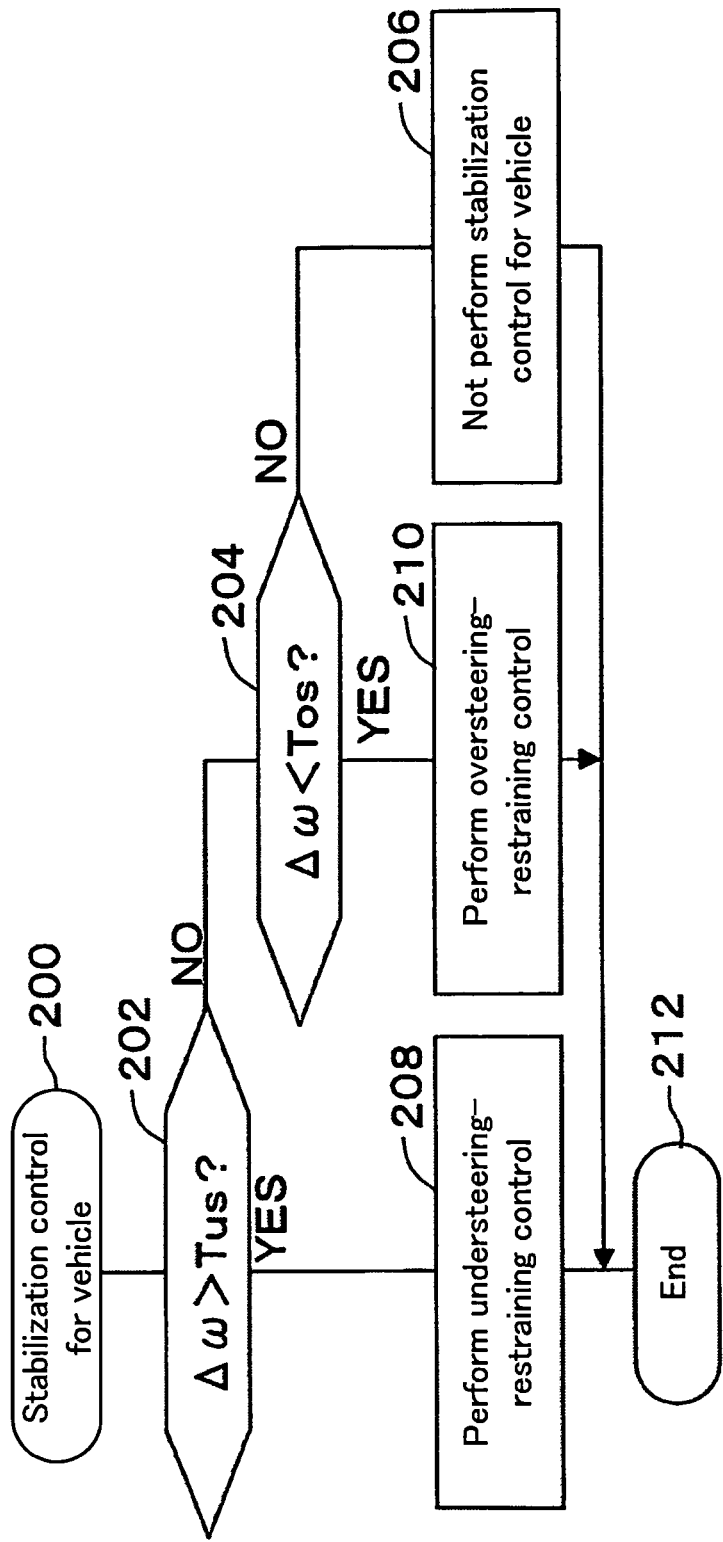
FIG. 4 is a flowchart schematically illustrating a vehicle stabilization control routine performed by the brake control ECU illustrated in FIG. 1.
Figure 5:
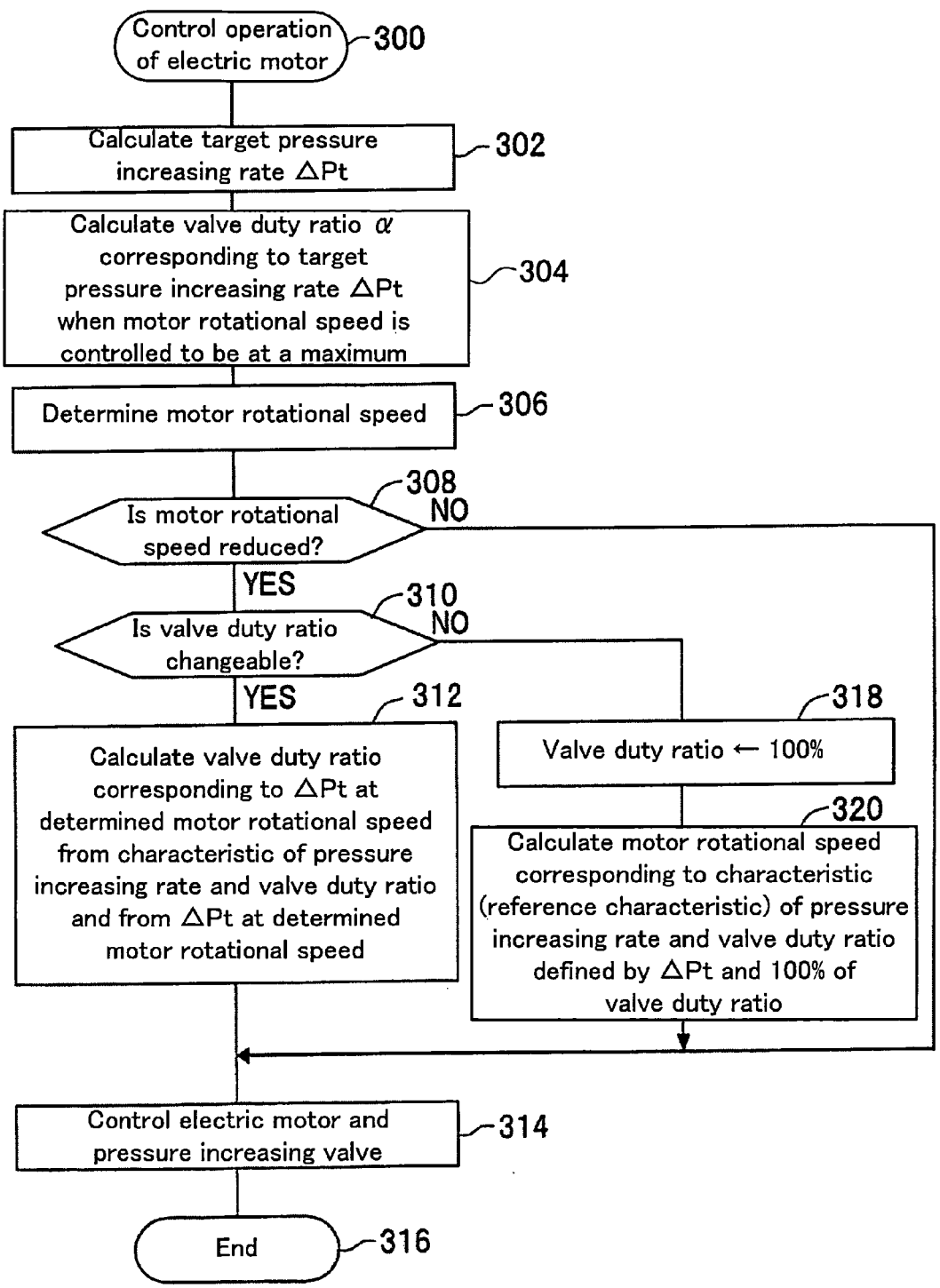
FIG. 5 is a flowchart schematically illustrating a motor operation control performed by the brake control ECU illustrated in FIG. 1.

In other words, the brake control ECU 26 performs a vehicle stabilization control routine as illustrated in FIG. 4. When the yaw rate deviation Δω is equal to, or greater than the threshold value Tos and is equal to, or lower than the threshold value Tus (Tos≦Δω≦Tus), the vehicle M is in a stabilized state. Therefore, the brake control ECU 26 determines "NO" in each of Steps 202 and 204 illustrated in FIG. 4 and advances the program to Step 206, hence the stabilization control for the vehicle M is not executed. Then, the brake control ECU 26 advances the program to Step 212 and the program is terminated temporarily.

When the yaw rate deviation Δω is greater than the threshold value Tus (Δω>Tus), the vehicle M is in an understeering state and is not in the stabilized state. Therefore, the brake control ECU 26 determines "YES" in Step 202 and advances the program to Step 208 so that the stabilization control for the vehicle M, i.e., an understeering-restraining control, is performed.

More specifically, the brake control ECU 26 individually controls braking force applied to any of the wheels Wfl, Wfr, Wrl and Wrr and controls a behavior of the vehicle M so as to stabilize the vehicle M in Step 208. In other words, the brake control ECU 26 applies the braking force to a predetermined wheel(s) from among the wheels Wfl, Wfr, Wrl and Wrr, and generates an inner moment relative to the vehicle M. In Step 208, any of the pumps 47 and 57 is operated by the electric motor 33 and the brake fluid is supplied to the master cylinder side of any of the pressure increasing control valve(s) 42, 43, 52 and 53, which are arranged between the master cylinder 23 and the wheel cylinder WC, for the corresponding wheel cylinder(s) WC, which corresponds to the predetermined wheel(s) W. Further, the operation of the solenoid valve(s) 42, 43, 52 and 53 is controlled so that a predetermined amount of the brake fluid (including a first amount of the brake fluid and a second amount of the brake fluid) is allowed to flow to the wheel cylinder side of the solenoid valve(s) 42, 43, 52 and 53. Thus, any of the wheel cylinders WC corresponding to the predetermined wheel(s) W** is applied with the hydraulic pressure even when the operator of the vehicle M does not operate the brake pedal 21. Step 208 serves as a hydraulic pressure applying means and a hydraulic pressure applying step.

For example, in a case where the front wheels Wfl and Wfr tend to skid during the vehicle M is turning in the left direction, a control for applying the braking force to the front-right wheel Wfr, the front-left wheel Wfl and the rear-left wheel Wrl is performed so as to restrain the front wheels Wfl and Wfr from skidding. Here, the electric motor 33 is electrically energized and thereby the pumps 47, 57 are controlled to operate. Further, the hydraulic pressure control valves 41, 51 are electrically energized and hence controlled to be in the pressure-difference generating state. The pressure increasing control valve 53, which corresponds to the rear-right wheel Wrr, is electrically energized so as not to apply the hydraulic pressure to the rear-right wheel Wrr, and at the same time, the pressure reducing control valve 56 is controlled to be in the closed state (the fluid-communication interrupting state) by not being electrically energized. Further, the pressure increasing control valve 43, 52, 42 respectively corresponding to the front-rear wheel Wfr, the front-left wheel Wfl and the rear-right wheel Wrr is controlled to be in the opened state (the fluid communicating state) by not being electrically energized, and the pressure reducing control valves 46, 55, 45 respectively corresponding to the front-rear wheel Wfr, the front-left wheel Wfl and the rear-left wheel Wrl is switched to the closed state (the fluid-communication interrupting state) by not being electrically energized.

In addition, the brake control ECU 26 sends a command to the engine control ECU 16, thus controlling an opening degree of a throttle valve 11b and the output torque of the engine 11 (indicated by reference numerals ③ and ④). Therefore, the behavior of the vehicle M is controlled to be stabilized. In other words, the throttle valve 11b is closed and thereby the output torque is restrained. Then, the brake control ECU 26 advances the program to Step 212 and the program is terminated temporarily.

On the other hand, when the yaw rate deviation Δω is smaller than the threshold value Tos (Δω<Tos), the vehicle M is in an oversteering state and is not in the stabilized state. Therefore, the brake control ECU 26 determines "NO" in Step 202 and "YES" in Step 204, and then advances the program to Step 210. Then, the brake control ECU 26 executes the stabilization control for the vehicle M, i.e., an oversteering-restraining control.

More specifically, the brake control ECU 26 individually controls the braking force applied to any of the wheels Wfl, Wfr, Wrl and Wrr and controls the behavior of the vehicle M so as to stabilize the vehicle M in Step 210. In other words, the brake control ECU 26 applies the braking force on an outside wheel(s) from among the wheels Wfl, Wfr, Wrl and Wrr, and generates an outward moment relative to the vehicle M. In Step 210, any of the pumps 47 and 57 is operated by the electric motor 33 and the brake fluid is supplied to the master cylinder side of any of the pressure increasing control valve(s) 42, 43, 52 and 53, which are arranged between the master cylinder 23 and the wheel cylinder WC, for the corresponding wheel cylinder(s) WC, which corresponds to the outside wheel(s). Further, the operation of the solenoid valve(s) 42, 43, 52 and 53 is controlled so that the predetermined amount of the brake fluid (including a first amount of the brake fluid and a second amount of the brake fluid) is allowed to flow to the wheel cylinder side of the solenoid valve(s) 42, 43, 52 and 53. Thus, any of the wheel cylinders WC corresponding to the outside wheel(s) W is applied with the hydraulic pressure even when the operator of the vehicle M does not operate the brake pedal 21. Thus, Step 210 serves as the hydraulic pressure applying means and the hydraulic pressure applying step.

For example, when the rear wheels Wrl and Wrr tend to skid during the vehicle M is turning in the left direction, a control for applying the braking force only to the front-rear wheel Wfr is executed so as to restrain the rear wheels Wrl and Wrr from skidding. Here, the electric motor 33 is electrically energized and the pumps 47 and 57 are controlled to operate. Further, the hydraulic pressure control valve 41 is electrically energized and hence controlled to be in the pressure-difference generating state. So as not to apply the hydraulic pressure to the wheels Wrl, Wfl and Wrr, i.e., to the wheels besides the front-rear wheel Wfr, the pressure increasing control valves 42, 52 and 53, which respectively correspond to the wheels Wrl, Wfl and Wrr, are electrically energized, and the pressure reducing control valves 45, 55 and 56, which respectively correspond to the wheels Wrl, Wfl and Wrr, are controlled to be in the closed state (the fluid-communication interrupting state) by not being electrically energized. Further, the pressure increasing control valve 43 corresponding to the front-right wheel Wfr is controlled to be in the opened state (the fluid communicating state) by not being electrically energized and the pressure reducing control valve 46 corresponding to the front-right wheel Wfr is controlled to be in the closed state (the fluid-communication interrupting state) by not being electrically energized. Then, the brake control ECU 26 advances the program to Step 212 and the program is terminated temporarily.

Herein, a control of an operation of the electric motor 33 for operating the pumps 47, 57 and a control of operations of the pressure increasing control valve 42, 43, 52 and 53, both of which are executed in Steps 208 and 210 as described above, will be described in detail with reference to FIG. 5.

The operation of the electric motor 33 is controlled in Step 300. In Step 302, the brake control ECU 26 calculates and sets a target pressure increasing rate ΔPt on the basis of a condition of the vehicle M. For example, when the brake control ECU 26 performs the understeering control in a case where the vehicle is in the understeering state, or when the brake control ECU 26 performs the oversteering control in a case where the vehicle is in the oversteering state, the brake control ECU 26 sets the target pressure increasing rate ΔPt at a high pressure level when the vehicle speed is high because a great amount of the brake fluid is necessary, and on the other hand, the brake control ECU 26 sets the target pressure increasing rate ΔPt at a low pressure level when the vehicle speed is low because such great amount of the brake fluid is not necessary.

In Step 304, the brake control ECU 26 calculates a valve duty ratio α corresponding to the target pressure increasing rate ΔPt in a case where rotational speed of the electric motor 33 (rotational speed of the motor) is controlled to be at a maximum. The rotational speed of the electric motor 33 corresponds to an output of the electric motor 33. The valve duty ratio α is a value calculated by dividing an ON time of the pressure increasing control valve 42 (and/or 43, 52, 53) by "ON time+OFF time" when the pressure increasing control valve 42 (and/or 43, 52, 53) is PWM-controlled. The ON time corresponds to a time when the pressure increasing control valve 42 (and/or 43, 52, 53) is in an open state, and the OFF time corresponds to a time when the pressure increasing control valve 42 (and/or 43, 52, 53) is in a close state. The valve duty ratio α is set within 0% to 100%. The amount of the brake fluid flowing from the pressure increasing valve 42 (and/or 43, 52, 53), which is controlled to operate at the valve duty ratio α of the maximum rotational speed Nmax, serves as a first amount of the brake fluid.

Figure 6:
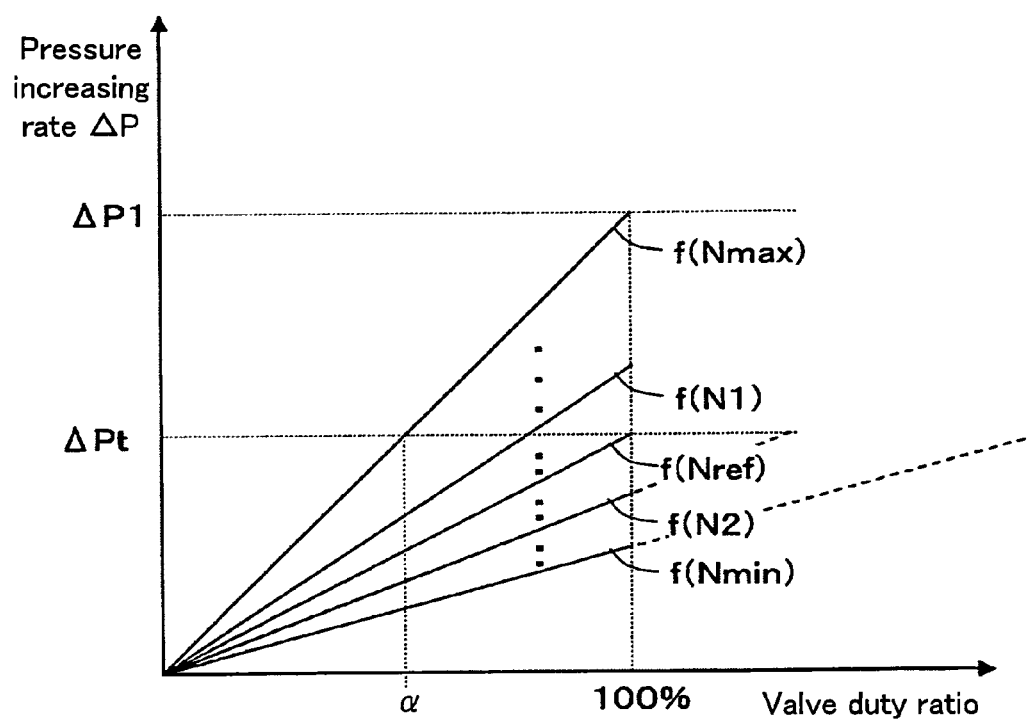
FIG. 6 is a map illustrating a characteristic of a pressure increasing rate and a valve duty ratio per motor rotational speed.

For example, the brake control ECU 26 derives the valve duty ratio α with a map illustrated in FIG. 6. The map in FIG. 6 illustrates characteristics of the pressure increasing rate ΔP and a valve duty ratio for every motor rotational speed. More specifically, the map in FIG. 6 illustrates a characteristic f(Nmax), a characteristic f(Nmin) and characteristics f(Nx). The characteristic f(Nmax) indicates a relationship between the pressure increasing rate ΔP and the valve duty ratio when the motor rotational speed is a maximum rotational speed Nmax (serving as a first rotational speed). The characteristic f(Nmin) indicates a relationship between the pressure increasing rate ΔP and the valve duty ratio when the motor rotational speed is a minimum rotational speed Nmin. Further, each of the characteristics f(Nx) indicates a relationship between the pressure increasing rate ΔP and the valve duty ratio when the motor rotational speed is each predetermined rotational speed between the maximum rotational speed Nmax and the minimum rotational speed Nmin. The characteristics f(Nx) include characteristics f(N1), f(N2) and f(Nref), which are described later. Additionally, the map in FIG. 6 may be produced with data obtained by actually using a vehicle. Alternatively, the map may be produced by a simulation, for example. In addition, the map illustrated in FIG. 6 is memorized in a memorizing device (not illustrated) included in the brake control ECU 26. Herein, the valve duty ratio, which is set within 0% and 100%, corresponds to the amount of the brake fluid flown from the pressure increasing valve(s), i.e., the flowing amount of the brake fluid is controlled in response to the valve duty ratio.

In each of the characteristics f(Nmax), f(Nmin) and f(Nx) (i.e., the characteristics f(N1), f(N2) and f(Nref)), the greater the valve duty ratio is, the larger the amount of the brake fluid flowing in the pressure increasing control valve 42 (and/or 43, 52, 53) per unit of time is. Therefore, the greater the valve duty ratio is, the greater the pressure increasing rate ΔP to the wheel cylinder WC is. Further, the higher the motor rotational speed is, the larger a supplying amount of each of the pumps 47, 57** is. Therefore, in a case where the valve duty ratio of each of the characteristics is assigned to be the same, the higher the motor rotational speed is, the greater the pressure increasing rate ΔP is. Additionally, when the motor rotational speed is assigned to be the maximum rotational speed and when the valve duty ratio is assigned to be 100%, the pressure increasing rate ΔP is assigned to be ΔP1. When the motor rotational speed is assigned to be the maximum rotational speed and when the valve duty ratio is assigned to be 0%, the pressure increasing rate ΔP is zero. With respect to other characteristics, when the valve duty ratio is assigned to be 0%, the pressure increasing rate ΔP is zero.

In Step 304, the brake control ECU 26 calculates the valve duty ratio α, which corresponds to the target pressure increasing rate ΔPt calculated in Step 302, by utilizing the characteristic f(Nmax).

Next, in Step 306, the brake control ECU 26 determines the motor rotational speed on the basis of the condition of the vehicle M and conditions surrounding the vehicle M such as a condition of a road surface, on which the vehicle M drives. Especially, when a predetermined condition is satisfied, the brake control ECU 26 controls the rotational speed of the electric motor 33 to be reduced in accordance with the condition described above. The predetermined condition is, for example, a condition where the condition surrounding the vehicle satisfies a predetermined relationship, such as a condition where a frictional coefficient of a road surface for driving the vehicle is smaller than a predetermined value.

More specifically, the frictional coefficient of the road surface is detected as the condition of the road surface in Step 306. For example in a case where the frictional coefficient of the road surface (which is one of the conditions surrounding the vehicle 1) is relatively small, the brake control ECU 26 determines the rotational speed of the electric motor 33 so as to make an operational amount of each of the pumps 47 and 57 to be smaller in comparison with a case where the frictional coefficient of the road surface is relatively large. As described above, the lower the detected frictional coefficient is, the more the rotational speed of the electric motor 33 is reduced. Step 306 serves as frictional coefficient detecting means and frictional coefficient detecting step. The frictional coefficient may be measured by driving the vehicle M on the road surface and then by measuring deceleration speed (i.e., negative acceleration speed) with the wheel speed sensors Sfl, Sfr, Srl and Srr, for example. Additionally, when the program is started, the motor rotational speed is set to be the maximum rotational speed Nmax. Further, in a case where the motor rotational speed is not required to be changed, a value of a predetermined motor rotational speed which is determined previously, or a value set in an initial time, is maintained.

Next, in Step 308, the brake control ECU 26 judges whether or not the motor rotational speed determined in Step 306 is reduced to be lower than the predetermined motor rotational speed. Additionally, the brake control ECU 26 may be programmed to determine that the motor rotational speed is reduced in a case where a value of the motor rotational speed determined in the current time becomes lower than the value of the predetermined motor rotational speed, which is determined previously, by a predetermined value.

In a case where the brake control ECU 26 judges that the motor rotational speed determined in Step 306 is not reduced to be lower than the predetermined motor rotational speed which is determined previously (i.e., when a negative answer is obtained in Step 308), the brake control ECU 26 advances the program to Step 314. In Step 314, the brake control ECU 26 controls the rotational speed of the electric motor 33 so as to correspond to the motor rotational speed determined in Step 306 (for example, to rotate in the maximum rotational speed Nmax when the brake control ECU 26 starts the control), and controls the operation of the pressure increasing valve 42 (and/or 43, 52, 53), which is to be applied with the hydraulic pressure, at the valve duty ratio α calculated in Step 304.

More specifically, in Step 314, the brake control ECU 26 PWM-controls the operation of the electric motor 33 so that the rotational speed of the electric motor 33 corresponds to the motor rotational speed calculated in Step 306. A value of the motor rotational speed of the electric motor 33 corresponds to a threshold value of voltage for reactivating the voltage to the electric motor 33 to an ON state under the brake control ECU 26 PWM-controlling the electric motor 33. Hereinafter, the threshold value of the voltage is referred to as an ON-state reactivating voltage. In a case where the ON-state reactivating voltage is set to be higher, the motor rotational speed is higher. On the other hand, when the ON-state reactivating voltage is set to be lower, the motor rotational speed is lower. The ON-state reactivating voltage is a voltage of which value is set to be lower than a value of power supply voltage (for example, 12V of a battery voltage) supplied to the electric motor 33. When regeneration voltage, which is generated when the voltage is shifted from the ON state for applying the voltage to the electric motor 33 to an OFF state for not applying the voltage to the electric motor 33, is lowered to the ON-state reactivating voltage, the electric motor 33 is switched, or reactivated, to the ON state again.

In other words, when the electric motor 33 is PWM-controlled, an ON time corresponding to a duration time of the ON state is applied with a feedback control so that an OFF time corresponding to a duration time of the OFF state is arranged to be a predetermined target time (for example 40 milliseconds). For example, when the ON time is assigned to be 20 milliseconds and the OFF time, which comes following the ON time, is assigned to be 50 milliseconds, the OFF time is longer than the 40 milliseconds of the target time. Accordingly, the ON time is reduced to be 10 milliseconds and the OFF time is further reduced. On the other hand, when the OFF time is shorter than the predetermined target time, the ON time is increased.

In addition, a control for the pressure increasing valve 42 (and/or 43, 52, 53) will be described hereinafter with an example where a control for applying the braking force (hydraulic pressure) only to the front-right wheel Wfr is performed so as to restrain the rear wheels Wrl and Wrr from skidding while the vehicle M is turning in the left direction. At this time, the hydraulic pressure control valve 41 is electrically energized and is arranged to be in the pressure-difference generating state. So as not to apply the hydraulic pressure to the wheels Wrl, Wfl and Wrr, i.e., the wheels besides the front-right wheel Wfr, the pressure increasing control valves 42, 52 and 53 respectively corresponding to the wheels Wrl, Wfl and Wrr are electrically energized and the pressure reducing valves 45, 55, 56 respectively corresponding to the wheels Wrl, Wfl and Wrr are closed by not being electrically energized. Then, the pressure increasing control valve 43 corresponding to the front-right wheel Wfr is applied with the PWM-control at the valve duty ratio α calculated as described above, and the pressure reducing control valve 46 corresponding to the front-right wheel Wfr is arranged to be in the closed state by not being electrically energized. Then, the brake control ECU 26 advances the program to Step 316 and the program is terminated temporarily.

On the other hand, when the brake control ECU 26 determines that the motor rotational speed determined in Step 306 is reduced to be lower than the predetermined motor rotational speed (i.e., when an affirmative answer "YES" is obtained in Step 308), the brake control ECU 26 distinguishes a case where the valve duty ratio is changeable from a case where the valve duty ratio is not changeable in Step 310, and then calculates the valve duty ratio and the motor rotational speed for each case.

Figure 7:
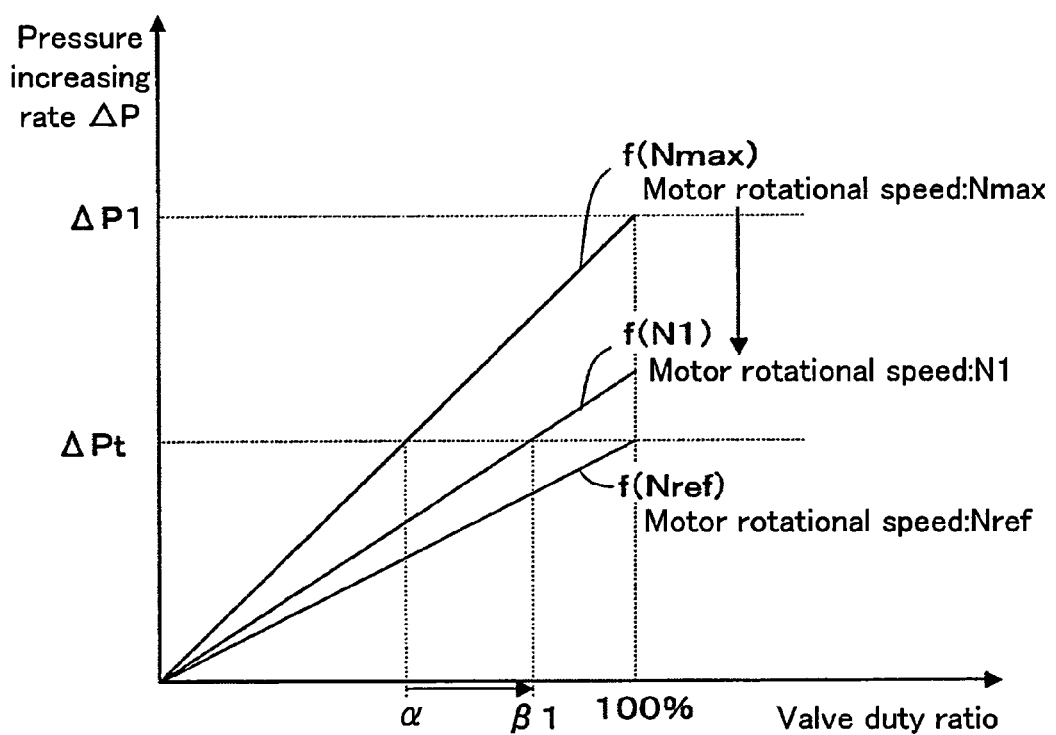
FIG. 7 is an explanatory view illustrating a method for calculating the valve duty ratio by utilizing the map illustrated in FIG. 6.

An operation of the brake control ECU 26, in the case where the valve duty ratio is changeable, will be described hereinafter with reference to FIG. 7. In Step 310, the brake control ECU 26 determines whether or not the valve duty ratio is changeable. Herein, the motor rotational speed determined in Step 306 is assigned to be N1 (serving as a second rotational speed).

More specifically, the brake control ECU 26 selects the characteristic f(N1) corresponding to the motor rotational speed N1 determined in Step 306 with the map illustrated in FIG. 6. Here, when there is a characteristic corresponding to the motor rotational speed N1 from among each of the characteristics, the characteristic corresponding to the motor rotational speed N1 is assigned to be the characteristic f(N1) and is selected by the brake control ECU 26. When there is no characteristic corresponding to the motor rotational speed N1, a characteristic, which is closer to the characteristic corresponding to the motor rotational speed N1, may be derived. Further, a reference characteristic f(Nref) is selected with the map illustrated in FIG. 6. The reference characteristic f(Nref) indicates a characteristic of the pressure increasing rate and the valve duty ratio, a characteristic which is defined by the target pressure increasing rate ΔPt and 100% of the valve duty ratio. A motor rotational speed indicating the reference characteristic is a reference rotational speed Nref. The motor rotational speed N1 is higher than the reference rotational speed Nref.

Then, the brake control ECU 26 compares an inclination of a graph of the characteristic f(N1) and an inclination of a graph of the reference characteristic f(Nref) illustrated in the map of FIG. 6. As a consequence, the brake control ECU 26 judges that the valve duty ratio is changeable because an inclining angle of the characteristic f(N1), corresponding to the motor rotational speed determined in Step 306, is higher than an inclining angle of the reference characteristic f(Nref). That is because a valve duty ratio β1, which corresponds to the target pressure increasing rate ΔPt, can be calculated from the characteristic f(N1) and the target pressure increasing rate ΔPt.

Accordingly, the brake control ECU 26 determines "YES" in Step 310 and advances the program to Step 312. Then, in Step 312, the brake control ECU 26 calculates a new valve duty ratio. More specifically, the brake control ECU 26 calculates the valve duty ratio (for example the valve duty ratio β1), which corresponds to the target pressure increasing rate ΔPt of the motor rotational speed N1 determined in Step 306, from the characteristic f(N1) of the pressure increasing rate and the valve duty ratio at the motor rotational speed (N1) determined in Step 306 and from the target pressure increasing rate A Pt. Herein, the amount of the brake fluid flowing from the pressure increasing valve 42 (and/or 43, 52, 53), which is controlled to operate at the valve duty ratio (the valve duty ratio β1) corresponding to the target pressure increasing rate ΔPt of the motor rotational speed N1 (second rotational speed), serves as a second amount of the brake fluid. In other words, the second amount of the brake fluid is set on the basis of the target pressure increasing rate ΔPt and the characteristic f(N1) predetermined by the valve duty ratio and the pressure increasing rate relative to the rotational speed N1 of the electric motor.

The calculated valve duty ratio β1 is a value which is larger than the valve duty ratio α determined by the characteristic f(Nmax) when the motor rotational speed is assigned to be the maximum rotational speed Nmax and by the target pressure increasing rate ΔPt. In other words, when the value of the motor rotational speed becomes lower, the valve duty ratio is made to be larger and the amount of the brake fluid flowing in the pressure increasing valves is increased, thus maintaining the value of the target pressure increasing rate ΔPt to be a value before the motor rotational speed lowers.

Further, in a method described above, the amount of the brake fluid, flowing from the pressure increasing valves per unit of time, may be increased in accordance with a degree of a reduction of the motor rotational speed so that the value of the valve duty ratio becomes greater in accordance with the degree of the reduction of the motor rotational speed becomes greater.

Then, the brake control ECU 26 advances the program to Step 314 and controls the electric motor 33 so that the rotational speed of the electric motor 33 is reduced to correspond to the motor rotational speed (N1) determined in Step 306. Further, the brake control ECU 26 controls the operation of the pressure increasing valves 42 (and/or 43, 52, 53), which is to be applied with the hydraulic pressure, to the valve duty ratio β1 calculated in Step 312, so as to increase the amount of the brake fluid.

More specifically, in Step 314, the brake control ECU 26 PWM-controls the operation of the electric motor 33 so that the rotational speed of the electric motor 33 corresponds to the motor rotational speed N1 calculated in Step 306. At this time, the ON-state reactivating voltage is changed to the value corresponding to the motor rotational speed N1. Further, for example, in a case where the control for applying the braking force only to the front-right wheel Wfr is performed so as to restrain the rear wheels from skidding during the vehicle M turns in the left direction, the pressure increasing valve 43 corresponding to the front-right wheel Wfr is PWM-controlled at the valve duty ratio β1. Then, the brake control ECU 26 advances the program to Step 316 and the program is terminated once.

As described above, in Steps 306 and 314, when the above-described predetermined condition (such as the condition of the road surface) is established in a case where the hydraulic pressure applying control means applies the hydraulic pressure to the wheel cylinder(s) WC**, the rotational speed of the electric motor 33 is reduced. Step 306 and Step 314 serve as motor controlling means and motor controlling step. Further, in Step 312 and 314, the flowing amount of the brake fluid flown by the operation of the pressure increasing valves 43 (or 42, 52, 53) per unit of time is increased before the rotational speed of the electric motor 33 is reduced when the motor controlling means controls the rotational speed of the electric motor 33 to be reduced. Step 312 and Step 314 serve as valve controlling means and valve controlling step. More specifically, for example, when the motor control means changes the rotational speed of the electric motor 33 from Nmax to N1, the valve controlling means changes the amount of the brake fluid by controlling the valve duty ratio to be changed from α to β1.

Figure 8:
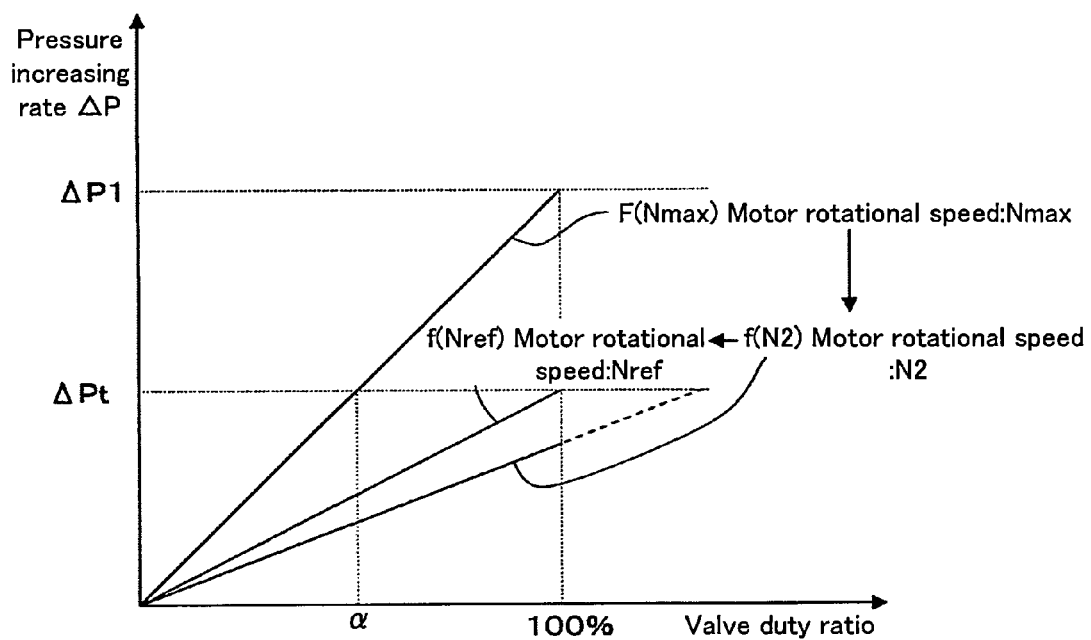
FIG. 8 is an explanatory view illustrating a method for calculating the valve duty ratio and the motor rotational speed by utilizing the map illustrated FIG. 6.

Hereinafter, an operation of the brake control ECU 26, in a case where the valve duty ratio is not changeable, will be described with reference to FIG. 8. Herein, the motor rotational speed determined in Step 306 is assigned to be N2 (serving as the second rotational speed), which is lower than the reference rotational speed Nref.

More specifically, the brake control ECU 26 selects the characteristic f(N2), which corresponds to the motor rotational speed N2 determined in Step 306, with the map illustrated in FIG. 6. Further, the reference characteristic f(Nref), which is the characteristic of the pressure increasing rate and the valve duty ratio and is defined by the target pressure increasing rate ΔPt and 100% of the valve duty ratio, is selected with the map illustrated in FIG. 6.

Then, the brake control ECU 26 compares an inclination of a graph of the characteristic f(N2) and the inclination of the graph of the reference characteristic f(Nref). As a consequence, the brake control ECU 26 determines that the valve duty ratio is not changeable because an inclining angle of the characteristic f(N2) corresponding to the motor rotational speed determined in Step 306 is smaller than the inclining angle of the reference characteristic f(Nref). That is because the valve duty ratio corresponding to the target pressure increasing rate ΔPt cannot be calculated from the characteristic f(N2) and the target pressure increasing rate ΔPt.

Accordingly, the brake control ECU 26 determines "NO" in Step 310 and determines that the valve duty ratio is 100% in Step 318. Further, the brake control ECU 26 calculates a new motor rotational speed in Step 320.

In Step 320, the brake control ECU 26 newly calculates the motor rotational speed corresponding to the reference characteristic f(Nref), which is the characteristic of the pressure increasing rate and the valve duty ratio and is defined by the target pressure increasing rate ΔPt calculated in Step 302 and 100% of the valve duty ratio. This motor rotational speed is assigned to be Nref. As described above, in a case where the valve controlling means increases the flowing amount of the brake fluid per unit of times to the maximum flowing amount of the pressure increasing control valve, (i.e., the valve duty ratio is set to be 100%), the motor rotational speed Nref of the electric motor 33 is employed. Accordingly, when the valve duty ratio is 100%, the motor rotational speed can be ensured so that the pressure increasing rate corresponds to the target pressure increasing rate ΔPt. Therefore, even though the motor rotational speed Nref is a value which is larger than the determined motor rotational speed N2, a quiet operation of the electric motor 33 can be ensured by reducing the motor rotational speed and a pressure-increasing responsiveness of the wheel cylinder WC** can be ensured.

Then, the brake control ECU 26 advances the program to Step 314 and controls the electric motor 33 so that the rotational speed of the electric motor 33 corresponds to the motor rotational speed (Nref) calculated in Step 320. At the same time, the brake control ECU 26 controls the pressure increasing control valve to be applied with the hydraulic pressure so as to include 100% of valve duty ratio calculated in Step 318.

More specifically, in Step 314, the brake control ECU 26 PWM-controls the electric motor 33 so that the rotational speed of the electric motor 33 corresponds to the motor rotational speed Nref calculated in Step 320. At this time, the ON-state reactivating voltage is changed to be a value corresponding to the motor rotational speed Nref. In addition, for example, in a case where the control for applying the braking force only to the front-right wheel Wfr is executed for restraining the rear wheels from skidding during the vehicle 1 is turning in the left direction, the pressure increasing control valve 43 corresponding to the front-right wheel Wfr is PWM-controlled at 100% of the valve duty ratio calculated as described above. In other words, the pressure increasing control valve 43 is controlled to be a fully opened state (100% opened state). Then, the brake control ECU 26 advances the program to Step 316 and the program is terminated temporarily.

As is apparent from the above description, according to the embodiment, when the motor controlling means (Steps 306, 314) reduces the rotational speed of the electric motor 33, the valve controlling means (Steps 31, 314) operates the pressure increasing valve 42 (and/or 43, 52, 53), which is arranged between the master cylinder 23 and the wheel cylinder WC** and is to be controlled with the hydraulic pressure, and increases the flowing amount of the brake fluid flowing to the wheel cylinder side of the pressure increasing valve 42 (and/or 43, 52, 53) for the wheel cylinder WC per unit of time. Thereby a reduction of the pressure increasing rate (relative to the wheel cylinder WC) caused by a reduction of the rotational speed of the motor rotational speed 33 is compensated with an increase of the flowing amount of the brake fluid by controlling the pressure increasing control valve 42 (and/or 43, 52, 53). Accordingly, the actual pressure increasing rate is controlled to be prevented from diverting from the target pressure increasing rate, which is set before the rotational speed of the electric motor 33 is reduced. Therefore, even though the rotational speed of the electric motor 33 is reduced, the pressure-increasing responsiveness to the wheel cylinder WC** can be properly obtained.

Further, the valve controlling means (Steps 312, 314) controls the flowing amount of the brake fluid flowing from the pressure increasing valve 42 (and/or 43, 52, 53) per unit of time to be increased in accordance with the reducing degree of the rotational speed of the electric motor 33, the rotational speed which is reduced by the motor controlling means (steps. 306, 314). Thereby, the reduction of the pressure increasing rate caused by the reduction of the rotational speed of the electric motor 33 can be properly compensated with the increase of the flowing amount of the brake fluid caused by a control of the pressure increasing control valve, the increase of the flowing amount which corresponds to an amount of the brake fluid for compensating the reduction of the pressure increasing rate. Accordingly, the target pressure increasing rate ΔPt is maintained to be the same determined before the rotational speed of the electric motor 33 is reduced.

Still further, in a case where the pressure increasing rate ΔP (pressure increasing rate characteristic), which is determined by the characteristic f(N2) and 100% of the valve duty ratio (maximum value of the brake fluid), is lower than the target pressure increasing rate ΔPt, the motor controlling means operates the electric motor 33 at the rotational speed Nref which is higher than the rotational speed N2 (second rotational speed) when the valve controlling means (Steps 312, 314) increases the flowing amount of the brake fluid per unit of time to the maximum flowing amount of the electromagnetic valve (Steps 320, 314). Thereby, the reduction of the pressure increasing rate caused by the reduction of the rotational speed of the electric motor 33 can be reduced and therefore, the actual pressure increasing rate is controlled to be prevented from diverting from the target pressure increasing rate which is set before the rotational speed of the electric motor 33 is reduced.

According to the above described embodiment, the flowing amount of the brake fluid flown from the pressure increasing valve 42 (and/or 43, 52, 53) per unit of time is changed by changing the duty ratio of the PWM-control. Alternatively, the flowing amount of the brake fluid flown from the pressure increasing valve 42 (and/or 43, 52, 53) per unit of time may be changed by changing an opening degree of the pressure increasing control valve, and/or by changing a differential pressure between an entrance side and an exit side of the pressure increasing valve 42 (and/or 43, 52, 53).

Further, according to the above described embodiment, a front-engine front-driving type (FF type) vehicle structured with the hydraulic brake apparatus of the diagonal conduit type (X conduit type) is employed. Alternatively, a front-engine rear-driving type (FR type) vehicle structured with a hydraulic brake apparatus of front-rear conduit type may be employed. Further according to the above described embodiment, the vacuum booster is employed as the booster. Alternatively, it is possible to employ a booster which accumulates the hydraulic pressure generated by the pumps in the accumulator and boosts the braking force by utilizing the hydraulic pressure. In addition, the motion control apparatus according to the present invention may be applied to a brake-by-wire type hydraulic brake apparatus.

According to the above described embodiment, the electronic stability control (stabilization control for the vehicle) is referred to as a control for automatically applying the hydraulic pressure to one of the wheel cylinders WC of the vehicle M by operating any of the pumps 47, 57**. Alternatively, the present invention may be applied to the traction control, a hill start assist apparatus, and so on, as a control for applying pressure automatically.

According to an aspect of the present invention, the output of the electric motor 33 corresponds to the rotational speed of the electric motor 33 and the motor controlling means (Step 306, 314) controls the rotational speed of the electric motor 33 to be reduced. Further, the valve controlling means (Step 312, 314) controls the amount of the brake fluid flowing from the pressure increasing valve(s) 42 (and/or 43, 52, 53) to be increased in accordance with the reduction degree of the rotational speed of the electric motor 33 reduced by the motor controlling means.

Further according to the aspect of the present invention, the hydraulic pressure applying means (Step 208, 210) controls the rotational speed of the electric motor 33 and the amount of the brake fluid flown from the pressure increasing valve(s) 42 (or/and 43, 52, 53) so as to maintain a target pressure increasing rate ΔPt determined on the basis of a condition of the vehicle M. Further, the hydraulic pressure applying means sets the amount of the brake fluid on the basis of the pressure increasing rate ΔP and the characteristic predetermined for every rotational speed of the electric motor 33 by the valve duty ratio (amount of the brake fluid) and the pressure increasing rate ΔP. Further, the motor controlling means and the valve controlling means change the rotational speed Nmax (first rotational speed) of the electric motor 33 to the rotational speed N1 (second rotational speed) of the electric motor 33, which is lower than the rotational speed Nmax and change the valve duty ratio α to the valve duty ratio β1 which is greater than α (i.e., change the first amount of the brake fluid to the second amount of the brake fluid) so that the rotational speed N1 and the valve duty ratio β1 correspond to the target pressure increasing rate ΔPt. Herein, the rotational speed Nmax and the first amount of the brake fluid is set to be the target pressure increasing rate ΔPt, and the second amount of the brake fluid is set on the basis of the target pressure increasing rate ΔPt and the characteristic f(N1) predefined by the amount of the brake fluid and the pressure increasing rate ΔP relative to the rotational speed N1 of the electric motor 33.

Still further according to the aspect of the present invention, the rotational speed N2 is determined by the condition of the vehicle M. When a pressure increasing rate characteristic, which is determined by the characteristic f(N2) of the amount of the brake fluid and the pressure increasing rate ΔP relative to the rotational speed N2 of the electric motor 33 and by 100% of the valve duty ratio (i.e., the maximum value of the amount of the brake fluid at the rotational speed N2) is lower than the target pressure increasing rate ΔPt, the motor controlling means (Step 314) operates the electric motor 33 with the rotational speed Nref, which is higher than the rotational speed N2.

Still further according to the aspect of the present invention, the brake control ECU 26 (serving as the vehicle motion control apparatus) further includes the frictional coefficient detecting means (Step 306) for detecting a frictional coefficient of the road surface as the condition of the road surface. The lower the frictional coefficient detected by the frictional coefficient detecting means is, the more the motor controlling means (Step 306, 314) reduces the output (rotational speed) of the electric motor 33.

Due to the above described structure, when the motor controlling means controls the rotational speed of the electric motor 33 to be reduced, the valve controlling means controls the pressure increasing valve 42 (and/or 43, 52, 53), which is arranged between the master cylinder 23 and the wheel cylinder WC, so as to increase the amount of the brake fluid flowing to the wheel cylinder side of the pressure increasing valve 42 (and/or 43, 52, 53) for the wheel cylinder(s) WC per the unit of time. Thereby, the reduction of the pressure increasing rate (relative to the wheel cylinder WC) caused by the reduction of the rotational speed of the electric motor 33 can be properly compensated with the increase of the flowing amount of the brake fluid caused by a control of the pressure increasing valve(s) 42 (and/or 43, 52, 53). Accordingly, the actual pressure increasing rate may be controlled to be prevented from diverting from the target pressure increasing rate, which is set or determined before the rotational speed of the electric motor 33 is reduced. Therefore, even though the rotational speed the electric motor 33 is reduced, the pressure-increasing responsiveness to the wheel cylinder WC can be properly obtained.

Further due to the above described structure, the valve controlling means (Steps 312, 314) controls the flowing amount of the brake fluid flowing from the pressure increasing valve 42 (and/or 43, 52, 53) per unit of time to be increased in accordance with the reducing degree of the rotational speed of the electric motor 33, the rotational speed which is reduced by the motor controlling means (steps. 306, 314). Thereby, the reduction of the pressure increasing rate caused by the reduction of the rotational speed of the electric motor 33 can be properly compensated with the increase of the flowing amount of the brake fluid caused by a control of the pressure increasing control valve. Accordingly, the target pressure increasing rate ΔPt is maintained to be the same determined before the rotational speed of the electric motor 33 is reduced.

Still further due to the above described structure, the motor controlling means controls the electric motor 33 to be increased when the valve controlling means (Steps 312, 314) increases the flowing amount of the brake fluid per unit of time to the maximum flowing amount of the electromagnetic valve (Steps 320, 314). Thereby, the reduction of the pressure increasing rate caused by the reduction of the rotational speed of the electric motor 33 can be reduced and therefore, the actual pressure increasing rate is controlled to be prevented from diverting from the target pressure increasing rate which is set before the rotational speed of the electric motor 33 is reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle motion control apparatus provided at a brake system including a master cylinder, wheel cylinders respectively provided at plural wheels of a vehicle, solenoid valves respectively provided between the master cylinder and the corresponding wheel cylinders and an electric motor operating a pump for controlling a supply of brake fluid to the wheel cylinder, the vehicle motion control apparatus applying a hydraulic pressure to the wheel cylinders at a predetermined pressure increasing rate based on a condition of the vehicle regardless of operation of a brake operation member by an operator of the vehicle, the vehicle motion control apparatus comprising:

hydraulic pressure applying means for applying the hydraulic pressure to any one of the wheel cylinders by operating the pump with the electric motor to supply brake fluid to a master cylinder side of the solenoid valve for the corresponding wheel cylinder and by controlling an operation of the solenoid valve to allow brake fluid to flow from the solenoid valve to a wheel cylinder side of the solenoid valve so that a target pressure increasing rate specified on a basis of the condition of the vehicle is satisfied even when the operator of the vehicle does not operate the brake operation member;

motor controlling means for controlling an output of the electric motor to be reduced in accordance with a condition of a road surface, on which the vehicle drives, when the hydraulic pressure applying means applies the hydraulic pressure to the wheel cylinder;

means for determining that the output of the electric motor has been reduced by the motor controlling means; and valve controlling means for controlling the operation of the solenoid valve to increase an amount of brake fluid allowed to flow from the solenoid valve by the operation of the solenoid valve whenever the means for determining determines that of the output of the electric motor has been reduced to maintain the target pressure increasing rate when the motor controlling means controls the electric motor to reduce the output, wherein when the motion control apparatus applies a hydraulic pressure to the wheel cylinders at the predetermined pressure increase rate when the operator of the vehicle does not operate the brake operation member, a reduction of the pressure increasing rate relative to the wheel cylinders caused by a reduction of the output of the electric motor by the motor controlling means is compensated with an increase of the pressure increasing rate by controlling the solenoid valve by the valve controlling means to increase the amount of brake fluid allowed to flow to the wheel cylinders.

2. A vehicle motion control apparatus according to claim 1, wherein the output of the electric motor corresponds to rotational speed of the electric motor and the motor controlling means controls the rotational speed of the electric motor to be reduced, and wherein the valve controlling means controls the amount of brake fluid allowed to flow from the solenoid valve to be increased in accordance with a reduction degree of the rotational speed of the electric motor reduced by the motor controlling means.

3. A vehicle motion control apparatus according to claim 2, wherein the hydraulic pressure applying means controls the rotational speed of the electric motor and the amount of brake fluid allowed to flow from the solenoid valve so as to maintain a target pressure increasing rate determined on the basis of a condition of the vehicle and sets the amount of brake fluid on the basis of a pressure increasing rate and a characteristic predetermined for every rotational speed of the electric motor by the amount of brake fluid and the pressure increasing rate, and wherein the motor controlling means and the valve controlling means change a first rotational speed of the electric motor to a second rotational speed of the electric motor which is lower than the first rotational speed and change a first amount of brake fluid to a second amount of brake fluid which is greater than the first amount of brake fluid so that the second rotational speed and the second amount of brake fluid correspond to the target pressure increasing rate, the first rotational speed and the first amount of brake fluid is set to be the target pressure increasing rate, and the second amount of brake fluid is set on the basis of the target pressure increasing rate and the characteristic predefined by the amount of brake fluid and the pressure increasing rate relative to the second rotational speed of the electric motor.

4. The vehicle motion control apparatus according to claim 3, wherein the second rotational speed is determined by the condition of the vehicle and when a pressure increasing rate characteristic determined by the characteristic of the amount of brake fluid and the pressure increasing rate relative to the second rotational speed of the electric motor and by a maximum value of the amount of brake fluid at the second rotational speed is lower than the target pressure increasing rate, the motor controlling means operates the electric motor with a rotational speed being higher than the second rotational speed.

5. A vehicle motion control apparatus according to claim 1, further comprising
frictional coefficient detecting means for detecting a frictional coefficient of the road surface as the condition of the road surface, and wherein the lower the frictional coefficient detected by the frictional coefficient detecting means is, the more the motor controlling means reduces the output of the electric motor.

6. A vehicle motion control apparatus according to claim 1, wherein the target pressure increasing rate is specified on a basis of whether or not the vehicle is in an understeering state, whether or not the vehicle is in an oversteering state, or a vehicle speed.

7. The vehicle motion control apparatus according to claim 1, wherein the valve controlling means controls the operation of the solenoid valve by a valve duty ratio calculated on a basis of the output of the electric motor determined by the motor controlling means and a characteristic of the pressure increasing rate and the valve duty ratio for the output of the electric motor determined by the motor controlling means, and when an inclination of the characteristic of the pressure increasing rate and the valve duty ratio for the output of the electric motor determined by the motor controlling means is smaller than an inclination of a reference characteristic indicating a characteristic of the pressure increasing rate and the valve duty ratio defined by the target pressure increasing rate and 100% of the valve duty ratio, the valve controlling means controls the operation of the solenoid valve at 100% of the valve duty ratio and the motor controlling means reduces the output of the electric motor determined by the motor controlling means to the output of the electric motor indicating the reference characteristic.

8. A method for controlling a vehicle motion, comprising:
a hydraulic pressure applying step for applying hydraulic pressure to any of wheel cylinders respectively provided at plural wheels of a vehicle by operating a pump for controlling a supply of brake fluid to the wheel cylinder with an electric motor, so as to supply brake fluid to a master cylinder side of any of solenoid valves respectively provided between a master cylinder and the corresponding wheel cylinders and by controlling an operation of the solenoid valve to allow brake fluid to flow from the solenoid valve to a wheel cylinder side of the solenoid valve so that a target pressure increasing rate specified on a basis of a condition of the vehicle is satisfied even when an operator of the vehicle does not operate a brake operation member, wherein hydraulic pressure is applied to the wheel cylinders at a predetermined pressure increasing rate based on the condition of the vehicle regardless of operation of the brake operation member by the operator of the vehicle;
a motor controlling step for controlling an output of the electric motor to be reduced in accordance with a condition of a road surface, on which the vehicle drives, when the hydraulic pressure is applied to the wheel cylinder in the hydraulic pressure applying step;
a determining step for determining that the output of the electric motor has been reduced; and
a valve controlling step for controlling the operation of the solenoid valve to increase an amount of brake fluid allowed to flow from the solenoid valve by the operation of the solenoid valve whenever it is determined that the output of the electric motor has been reduced to maintain the target pressure increasing rate when the output of the electric motor is controlled to be reduced in the motor controlling step,
wherein during the hydraulic pressure applying step when a hydraulic pressure is applied to the wheel cylinders at the predetermined pressure increase rate when the operator of the vehicle does not operate the brake operation member, a reduction of the pressure increasing rate relative to the wheel cylinders caused by a reduction of the output of the electric motor in the motor controlling step is compensated with an increase of the pressure increasing rate by controlling the solenoid valve in the valve controlling step to increase the amount of brake fluid allowed to flow to the wheel cylinders.

9. A method for controlling a vehicle motion according to claim 8, wherein the output of the electric motor corresponds to rotational speed of the electric motor and the rotational speed of the electric motor is controlled to be reduced in the motor controlling step, and wherein the amount of brake fluid allowed to flow from the solenoid valve is controlled to be increased in the valve controlling step in accordance with a reduction degree of the rotational speed of the electric motor reduced in the motor controlling step.

10. A method for controlling a vehicle motion according to claim 9,
wherein the rotational speed of the electric motor and the amount of brake fluid allowed to flow from the solenoid valve is controlled so as to maintain a target pressure increasing rate determined on the basis of a condition of the vehicle and the amount of brake fluid is set on the basis of a pressure increasing rate and a characteristic predetermined for every rotational speed of the electric motor by the amount of brake fluid and the pressure increasing rate in the hydraulic pressure applying step,
and wherein a first rotational speed of the electric motor is changed to a second rotational speed of the electric motor which is lower than the first rotational speed and a first amount of brake fluid is changed to a second amount of brake fluid which is greater than the first amount of brake fluid in the motor controlling step and the valve controlling step so that the second rotational speed and the second amount of brake fluid correspond to the target pressure increasing rate, the first rotational speed and the first amount of brake fluid is set to be the target pressure increasing rate, and the second amount of brake fluid is set on the basis of the target pressure increasing rate and the characteristic predetermined by the amount of brake fluid and the pressure increasing rate relative to the second rotational speed of the electric motor.

11. A method for controlling a vehicle motion according to claim 10, wherein the second rotational speed is determined by the condition of the vehicle and when a pressure increasing rate characteristic determined by the characteristic of the amount of brake fluid and the pressure increasing rate relative to the second rotational speed of the electric motor and by a maximum value of the amount of brake fluid at the second rotational speed is lower than the target pressure increasing rate, the electric motor is controlled to operate with a rotational speed being higher than the second rotational speed in the hydraulic pressure applying step.

12. A method for controlling a vehicle motion according to claim 8, further comprising:
a frictional coefficient detecting step for detecting a frictional coefficient of the road surface as the condition of the road surface,
wherein the lower the frictional coefficient detected by the frictional coefficient detecting means is, the more the output of the electric motor is reduced in the motor controlling step.

13. A method for controlling a vehicle motion according to claim 8, wherein the target pressure increasing rate is specified on a basis of whether or not the vehicle is in an understeering state, whether or not the vehicle is in an oversteering state, or a vehicle speed.

14. The vehicle motion control apparatus according to claim 8, wherein the valve controlling means controls the operation of the solenoid valve by a valve duty ratio calculated on a basis of the output of the electric motor determined by the motor controlling means and a characteristic of the pressure increasing rate and the valve duty ratio for the output of the electric motor determined by the motor controlling means, and when an inclination of the characteristic of the pressure increasing rate and the valve duty ratio for the output of the electric motor determined by the motor controlling means is smaller than an inclination of a reference characteristic indicating a characteristic of the pressure increasing rate and the valve duty ratio defined by the target pressure increasing rate and 100% of the valve duty ratio, the valve controlling means controls the operation of the solenoid valve at 100% of the valve duty ratio and the motor controlling means reduces the output of the electric motor determined by the motor controlling means to the output of the electric motor indicating the reference characteristic.

* * * * *